2,892,752
METHOD OF TREATING WORMS IN RUMINANTS

Thomas O. Booth, deceased, late of Springtown, Tex., by Leta P. Booth, administratrix, Springtown, Tex.

No Drawing. Application January 30, 1957
Serial No. 637,102

2 Claims. (Cl. 167—53)

This invention relates to a method of treating parasites which grow and develop in the stomachs.

This application is a continuation-in-part of a previous application filed in the Patent Office May 14, 1953, under Serial No. 355,161, now abandoned, and entitled "Composition for Treating Parasites in Livestock and Method of Preparation Thereof."

In the grazing of livestock, parasites may infect a field and propagate themselves in a life cycle such as may become extremely dangerous to the health and developments of the livestock. Because of the life cycle of the parasites it is extremely difficult to eradicate them. Eggs which are present in the feces of the livestock will form parasitic larvae that crawl onto vegetation which forms the natural food of the livestock. The parasitic larvae thus become swallowed and attach themselves to the walls of the animal's stomach whereupon they suck blood from the stomach and infect the lining thereof. Animals having these parasitic larvae will become weakened and lose weight, the more severe infestations resulting in the death of the animals. The adult parasites lay eggs within the stomach of the animals and become again dropped to the ground to complete the cycle. Certain weather conidtions may result in the eggs lying dormant for as long as a year before hatching. Upon hatching, the larvae may exist for another year in their growth before ultimately dying and after having propagated more parasites through the above egg laying process.

In controlling parasites of this nature, it becomes necessary to stamp out the parasites completely in all stages of their development or, as an alternative, to continuously prevent the parasites from existing in one or more of the stages of their life cycle.

A number of chemicals have been proposed for killing and controlling internal parasites in such animals as sheep. For example, copper sulphate and nicotine sulphate have been use for worming sheep. A more effective treatment was developed in the form of a combination of copper sulphate and sodium arsenite as disclosed in U.S. Patent No. 2,280,340, dated April 21, 1942, in which Thomas O. Booth was co-inventor. In that patent disclosure, the copper sulphate and sodium arsenite were mixed with a supply of sodium chloride and formed into salt blocks to which ranch animals would have free access. It was pointed out in that patent that copper sulphate alone was not an efficient vermicide for internal parasites when used in normal feeding channels but that its use became toxic to animals when consumed daily. Similarly, sodium arsenite in small quantities would cause arsenic poisoning, being irritating to the mucous membranes of the animals and highly toxic so as to ordinarily cause the death of an animal when used in as small a quantity as one percent in one ounce of solution.

On the other hand, by premixing the copper sulphate and sodium arsenite in dry form and in proper chemical proportions with an inert vehicle such as dry salt, the active constituents will react when taken into the mouth of the animal. The new compounds formed are copper arsenite and sodium sulphate. The saliva of the animal's mouth, or pure water for that matter, will cause the reaction. Copper arsenite is insoluble in water and therefore could not act as a parasiticide unless ionized in solution. Fortunately, the stomach of the animal has a certain amount of hydrochloric acid present which will cause a controlled reversal of the reaction to form some copper sulphate and arsenic oxide, together with sodium chloride. In this form, the chemicals are capable of killing the parasitic larvae in the stomachs of the animals in question.

Because of the natural feeding habits of the animals, they will not overdose themselves. At the same time, the animals will lick the salt at frequent periods and absorb small but steady treatments. If continued long enough, the cycle of life of the parasites will be interrupted so as to finally abolish them from the range.

Unfortunately, however, the salting method as disclosed in the above mentioned prior art patent, does not satisfactorily kill adult parasites. It is, therefore, only at the intermediate stage of the cycle of their life that the parasites can be controlled. Although larvae are killed by the salting method, the adult parasites continue to lay eggs and the eggs continue to hatch into larvae which are present on the grass and are taken into the stomach of the animal. Since these newly eaten larvae are all killed, it appears as though the parasites are permanently eliminated, but it may be readily seen that the scourge can again flare up at any time the salting procedure is relaxed. As a result of further experimentation, the conclusion was reached that the salting method is more properly termed a control of parasites and only a means of irradicating them if the procedure is properly maintained to the ultimate conclusion.

Because of the tendency on the part of human beings to be more concerned with cure than prevention, the salt treatment is often abandoned by the livestock owner as soon as visible signs of the affliction have left the range. It is, therefore proposed by the invention to provide for a treatment which will function both as a temporary irradicator of adult parasites and larvae as well as a continuous irradicator of larvae as they are taken into the stomachs of the animals. Thus, if all the adult parasites are killed and no new larvae are allowed to reach adulthood in the stomachs of the livestock, only the eggs in the range will be allowed to live. Since there will be no new eggs deposited, the life cycle of the parasites can be much more quickly and permanently interrupted.

The invention, therefore, constitutes a method for administering a composition which can be given to livestock such as sheep in periodic dosage to irradicate all parasites present at the time, both larvae and adults. The salting procedure is preferably continued between the dosages of the composition which comprises the instant invention.

The composition contains the same active ingredients as those disclosed in Patent Number 2,280,340, the method of manufacture and the total composition being altered so as to greatly increase the efficacy of the treatment while, at the same time, decreasing the toxicity of the dosage. The ingredients and proportions of a typical example are as follows:

10 parts of sodium arsenite
40 parts of copper sulphate
1000 parts of water
Chemically pure hydrochloric acid sufficient to react with copper arsenite formed
25 parts of a 1 to 1000 solution of aniline dye.

The sodium arsenite is dissolved in two hundred parts of the water which has been warmed to 80 or 90 degrees C. The copper sulphate is separately dissolved in eight hundred parts of the water and likewise heated to from 80 to 90 degrees C. The two water solutions are then mixed thoroughly to cause water insoluble copper arsenite to participate. Chemically pure hydrochloric acid is immediately added until a clearing effect indicates that a light suspension of copper suphate, sodium chloride, and arsenic monixide are being formed. The addition of the acid should be accomplished over a short period of time, preferably not to exceed fifteen seconds. The reason for adding the acid quickly is to prevent large crystals from forming and estabalishing a relatively large portion of water insoluble solids within the preparation.

The type of water used, the speed of adding the acid and the order of mixing the ingredients all affect the amount of acid which is necessary to clear the liquid mixture properly. It has been found, however, that, under average circumstances and where the addition of acid did not extend over twenty seconds, the clarafication of the solution with 100 ccs. of commercial full-strength hydrochloric acid for four and three-quarter gallons of the solution prepared could be accomplished.

The suspension is then filtered and 25 parts of aqueous solution of a non-toxic aniline dye of the food class dye, e.g. such as trisodium of 1-(4-sulfo-1-naphthlazo)-2-naphthol-3,6-disulfonic acid; sodium cumeneazo-beta-naphthol disulfonate; 1-xylylazo-2-naphthol; or ortho-tolylazo-ortho-tolylazo-beta-naphthol is added to the preparartion for stabilizing the emulsion. The stabilizing renders the product detoxified to a considerable degree and this effect is accomplished only by adding the aniline dye after the acidification step and not before. The mechanism by which the emulsion is stabilized and detoxified is not fully understood, but it appears that the dye is deposited on the surface of the previously formed colloidal particles to achieve the desired purpose. The aqueous solution of dye is mixed in a ratio of from 1 part dye to 500 parts water at the higher concentration down to 1 part of dye to 2000 parts of water at the lowermost concentration. The preferred range of concentration of dye in the aqueous solution lies in a preferred range of from 1 part dye to 800 parts water to 1 part dye to 1500 parts water. This preparation can then be given to animals without further dilution. It is understood that the ratio of dye to solvent may be varied considerably since the dye is numerically a minor constituent of my colloidal preparation. The dye is then dissolved as a stock solution for easy handling and measurement when compounding the colloidal preparation.

The increased activity of the high colloidal compound over previous arsenic containing liquids or emulsions is an important feature of the invention. Thus, a smaller amount of the product at higher concentrations can be used to accomplish the same results in killing parasites. The higher concentration of the copper sulphate component has been found to cause a constriction of the esophical grove when a ruminant swallows the parasiticide disclosed herein. The product therefore passes directly into the fourth stomach where the parasites tend to lodge. The concentration of the total product thus remains adequate to kill the parasites present. A lesser concentration of solution containing copper sulphate than 2½% will not cause the liquid to bypass the rumin of the first stomach. The rumins provide a storage space for large amounts of liquid and undigested food and do not form a natural habitat for pararsites. A lower concentration of the product, not having sufficient copper sulphate to cause the aforementioned constriction, will thus become further diluted prior to contacting parasites in the fourth stomach and may not have sufficient strength left under those circumstances to kill parasites.

As pointed out previously, the coloidal product of this invention is much less toxic, in its effect upon animals and even accidental double doses which can easily be administered by mistake to the same animal out of a group, will not harm the animal. An ordinary dose of the stable liquid product will free an animal such as a sheep from worms, having killed all adults and larvae present. The liquid emulsion or colloidal suspension is forcefully fed to the animal after having deprived it of food for some time previously to prevent undue muscular activity in the stomach of the animal which will cause the parasiticide product to move through the alimentary canal too rapidly, and to prevent premature dilution of the product before it has had a chance to act upon the parasites and larvae. Between forceful feeding periods, the animals are given the opportunity to lick the salt mixed with the vermifuge as disclosed in the above named previously issued patent. By experimentation it has been determined that forceful feeding of my colloidal product is most effectively carried out at about 21 day intervals. Since the colloidal product is less toxic than ordinary previous dose type products containing arsenic, there is no problem created by administering the colloidal parasiticide concurrently with the lick salt vermifuge.

Since it is the adult parasites which sap the strength of the animals, even to the point of killing them, the very first treatment according to the present invention will bring surprising results in the recovery of the animal. In some instances it has cured sheep which were so weak and sick from loss of blood and nourishment that other treatments of a nature sufficiently drastic to kill the parasites probably would have caused the death of the animal. A fast acting quality of the compound will also maintain the rate of growth of young animals such as lambs. The fast and complete action on adult parasites present in the stomach and intestines of growing lambs will immediately be evident from their gain in weight and size. In adult animals which are being fattened for market, killing the adult parasites will also show remarkably quick results. Oftentimes ranch animals may be afflicted with dysentery or other disorders, caused by Protozoa, especially coccidia. The coccidia may be present at the same time as parasites or one disorder may be present in some sheep with the other present in the remainder, of the indisposed sheep. The composition of the present invention will generally kill all coccidia in one treatment and, hence, will serve a double function in the case of animals having both parasites and Protozoa.

It may thus be seen that there has been developed a novel parasiticide solution containing one or more arsenic compounds in finely divided colloidal state in which the same amount of compound is less toxic to an animal and more effective in killing both adult parasites and larvae which are present in the stomach of an animal.

What is claimed is:

1. A method of administering treatment for killing worms in ruminants which consists in orally dosing an animal of the ruminant class with a water solution containing sodium arsenite, copper sulphate, hydrochloric acid, and aniline dye, said copper sulphate being present in the total dosage in a concentration of from two and one-half percent to five percent, thereby causing restriction and closure of the esophagal grove of the animal and subjecting the worms in the fourth stomach to substantially the full and undiluted strength of the solution.

2. A method of administering treatment for killing worms in ruminants which consists in orally dosing an animal of the ruminant class with a water solution containing substantially 10 parts of sodium arsenite, 40 parts of copper sulphate, water, chemically pure hydrochloric acid sufficient to clarify the foregoing, and approximately 25 parts of a 1 to 1000 solution of aniline dye, said water ranging from approximately 500 to 1000 parts, the dosage being such as to cause restriction and closure of the esophagal grove and subjecting the worms in the fourth stomach to substantially the full and undiluted strength of the solution.

References Cited in the file of this patent

UNITED STATES PATENTS 1,839,970   Konantz ----------------- Jan. 5, 1932

UNITED STATES PATENT OFFICE
CERTIFICATE OF CORRECTION

Patent No. 2,892,752                                June 30, 1959

Thomas O. Booth, deceased, by Leta P. Booth, administratrix

It is hereby certified that error appears in the printed specification of the above numbered patent requiring correction and that the said Letters Patent should read as corrected below.

Column 1, line 16, after "stomachs" insert -- and intestines of livestock --; column 3, line 7, for "participate" read -- precipitate --; line 14, for "estabalishing" read -- establishing --; lines 22 and 23, for "clarafication" read -- clarification --; line 33, for "preparartion" read -- preparation --; line 74, for "pararsites" read -- parasites --.

Signed and sealed this 19th day of January 1960.

(SEAL)
Attest:
KARL H. AXLINE
Attesting Officer

ROBERT C. WATSON
Commissioner of Patents